United States Patent [19]
Solomon

[11] Patent Number: 5,925,134
[45] Date of Patent: Jul. 20, 1999

[54] METHOD AND APPARATUS FOR POWER MANAGEMENT

[75] Inventor: Gary Solomon, Hillsboro, Oreg.

[73] Assignee: Intel Corporation, Santa Clara, Calif.

[21] Appl. No.: 08/941,148

[22] Filed: Sep. 30, 1997

Related U.S. Application Data

[51] Int. Cl.⁶ ..................................................... G06F 1/32
[52] U.S. Cl. ............................................................ 713/324
[58] Field of Search ........................ 395/750.01, 750.04,
395/750.05, 750.06, 560, 559; 713/300,
322, 323, 324, 600, 601

[56] References Cited

U.S. PATENT DOCUMENTS

| | | | |
|---|---|---|---|
| 5,504,910 | 4/1996 | Wisor et al. ........................ 395/750.04 |
| 5,560,022 | 9/1996 | Dunstan et al. .................... 395/750.01 |
| 5,625,807 | 4/1997 | Lee et al. ................................. 395/560 |
| 5,642,489 | 6/1997 | Bland et al. ............................. 395/308 |
| 5,689,714 | 11/1997 | Moyer ................................. 395/750.05 |
| 5,765,003 | 6/1998 | MacDonald et al. .............. 395/750.04 |
| 5,784,627 | 7/1998 | MacDonald ........................ 395/750.01 |

Primary Examiner—Glenn A. Auve
Attorney, Agent, or Firm—Blakely, Sokoloff, Taylor & Zafman

[57] ABSTRACT

An apparatus includes a first register having a first field that stores a first value that indicates a power management state of a bus. A bus regulator is coupled to the first register. The bus regulator regulates the bus according to the power management state.

18 Claims, 5 Drawing Sheets

| ORIGINATING DEVICE POWER STATE | I/O BUS POWER STATE | POSSIBLE FUNCTION POWER STATES |
|---|---|---|
| D0 | B0 | D0, D1, D2, D3 |
| D1 | B1 | D1, D2, D3 |
| D2 | B2 | D2, D3 |
| D3 (D3 HOT, D3 COLD) | B3 | D3 |

*FIG. 3*

| DEVICE ID | | VENDOR ID | |
|---|---|---|---|
| STATUS | | COMMAND | |
| CLASS CODE | | | REVISION ID |
| BIST | HEADER TYPE | LATENCY TIMER | CACHE LINE SIZE |
| BASE ADDRESS REGISTERS | | | |
| CARDBUS CIS POINTER | | | |
| SUBSYSTEM ID | | SUBSYSTEM VENDOR ID | |
| EXPANSION ROM BASE ADDRESS | | | |
| RESERVED | | | CAP_PTR |
| RESERVED | | | |
| MAX_LAT | MIN_GNT | INTERRUPT PIN | INTERRUPT LINE |

METHOD AND APPARATUS FOR POWER MANAGEMENT

FIELD OF THE INVENTION

The present invention relates to the field of computer systems. More specifically, the present invention relates to power control management in computer systems.

BACKGROUND OF THE INVENTION

Power management in current personal computer (PC) platforms are performed by a combination of basic input output systems (BIOS) and System Management Mode (SMM) code utilizing hardware unique to each platform and device drivers with power saving features.

The BIOS and SMM code solution typically involves detecting inactivities of designated input/output (I/O) devices, such as a keyboard or mouse, in a computer system. After the designated I/O devices have been inactive for a predetermined period of time, the BIOS and SMM code puts the computer system in a sleep state where the computer system operates under low power by powering down various I/O devices and components in the computer system. While the BIOS and SMM strategy has successfully brought the PC platform into the mobile environment, it is beset with problems in the desktop environment where the PC may be connected to additional I/O devices not recognized by the BIOS and SMM code. I/O devices that are not recognized and not monitored by the BIOS and SMM code may have associated devices powered down or may themselves be powered down while in the middle of an operation. In addition, I/O devices that are not recognized by the BIOS and SMM code may be powered down completely when they require special power management such as auxiliary power to keep a portion of the I/O device active at all times.

Device drivers with power saving features also offer power management options. The device drivers monitor their corresponding devices for inactivity and puts those devices in a lower power state when the devices are inactive. However, since the device drivers are not aware of the applications running in the system, they manage the devices conservatively without taking full advantage of potential power savings.

SUMMARY

An apparatus according to an embodiment of the present invention is disclosed. The apparatus includes a first register having a first field that stores a first value that indicates a power management state of a bus. A bus regulator is coupled to the first register. The bus regulator regulates the bus according to the power management state.

BRIEF DESCRIPTION OF THE DRAWINGS

The present invention is illustrated by way of example and not by way of limitation in the figures of the accompanying drawings, in which the like references indicate similar elements and in which:

FIG. 3 is a table listing power management states supported by an embodiment of the present invention;

FIG. 4 is a block diagram illustrating a standard PCI configuration space configured to support the present invention according to an embodiment of the present invention.

DETAILED DESCRIPTION

Figure 1:
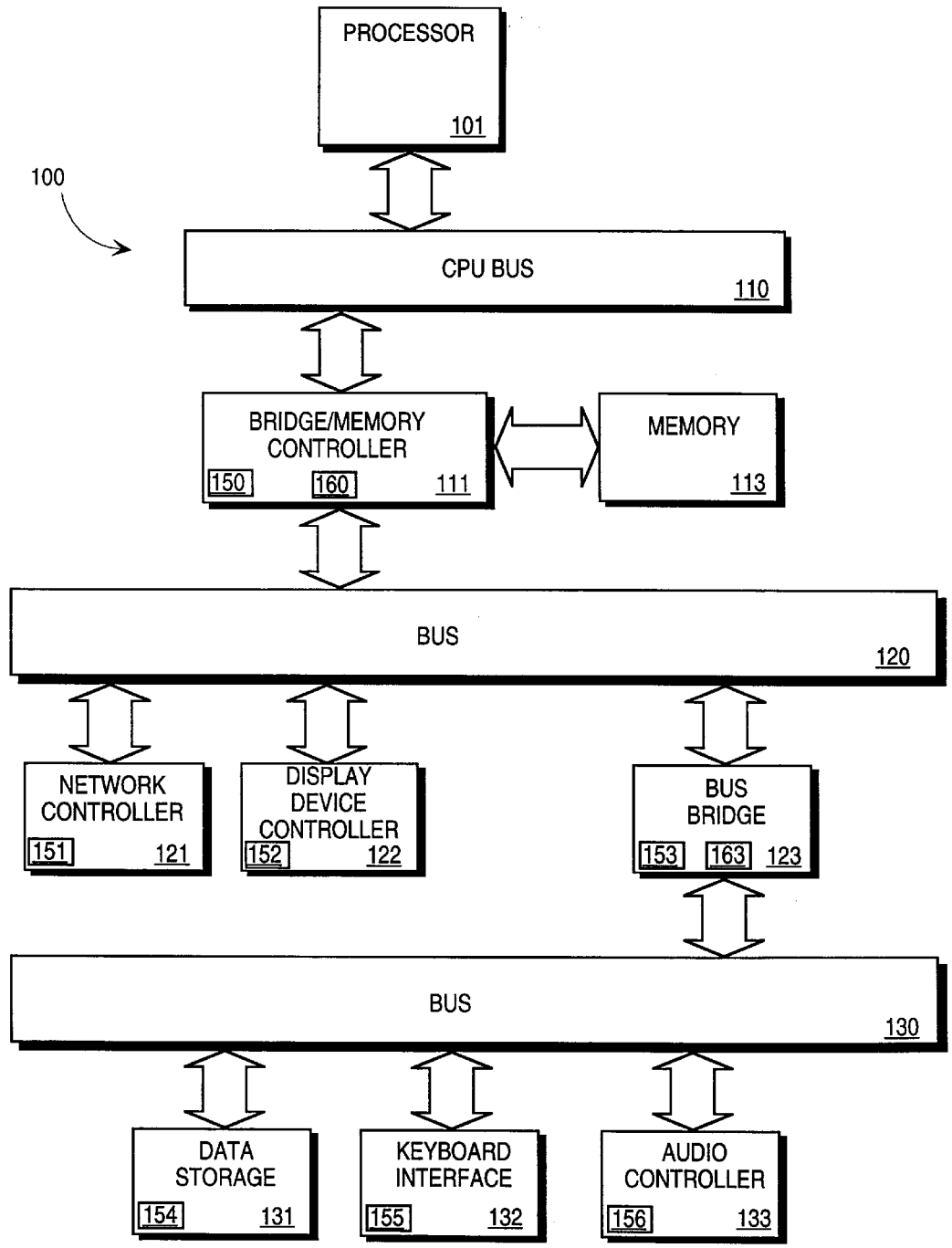
FIG. 1 is a block diagram of a computer system implementing an embodiment of the present invention.

Referring to FIG. 1, a computer system upon which an embodiment of the present invention can be implemented is shown as 100. The computer system 100 includes a processor 101 that processes data signals. The processor 101 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

As an example, memory 113 may be a dynamic random access memory (DRAM) device, a static random access memory (SRAM) device, or other memory device. The memory 113 stores data signals that may be executed by the processor 101.

A bridge memory controller 111 is coupled to the CPU bus 110 and the memory 113. The bridge memory controller 111 directs data signals between the processor 101, the memory 113, and other components in the computer system 100 and bridges the data signals from these components to a first I/O bus 120. From the perspective of the processor 101 and an operating system running in the processor 101, the bridge memory controller 111 is the originating device for the first I/O bus 120 since it is the first downstream bridge connected to the I/O bus 120. According to an embodiment of the present invention, bridge memory controller 111 includes a bus regulator 160 that operates to regulate the first I/O bus 120. The bus regulator 160 may be a clock regulator that adjusts the speed of first I/O bus 120, a power regulator that adjusts the power to the first I/O bus 120, or other regulator that adjusts other features of the first I/O bus 120. It should be appreciated that the bus regulator may reside externally to the bridge memory controller 111.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 links the computer system 100 to a network of computers and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100.

A second I/O bus 130 may be a single bus or a combination of multiple buses. As an example, the second I/O bus 130 may comprise a PCI bus, a PCMCIA bus, a NuBus, or other buses. The second I/O bus 130 provides communication links between components in the computer system 100. A keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. A data storage device 131 may be a hard disk drive, a floppy disk drive, a CD-ROM device, a flash memory device or other mass storage device. An audio controller 133 operates to coordinate the recording and playing of sounds is also coupled to the I/O bus 130.

A bus bridge 123 couples the first I/O bus 120 to the second I/O bus 130. The bus bridge 123 operates to buffer and bridge data signals between the first I/O bus 120 and the second I/O bus 130. From the perspective of the processor 101 and an operating system running in the processor 101, the bridge memory controller 123 is the originating device for the second I/O bus 130 since it is the first downstream bridge connected to the second I/O bus 130. According to an embodiment of the present invention, bus bridge 123 includes a bus regulator 163 that operates to regulate the second I/O bus 130. The bus regulator 163 may be a clock regulator that adjusts the speed of second I/O bus 130, a power regulator that adjusts the power to the second I/O bus 130, or other regulator that adjusts other features of the second I/O bus 130. It should be appreciated that the bus regulator 163 may reside externally to the bus bridge 123. According to a preferred embodiment of the present invention, both the first I/O bus and the second I/O bus are PCI buses.

The bridge memory controller 111, network controller 121, display device controller 122, bus bridge 123, data storage device 131, keyboard interface 132, and audio controller 130 are computer system components that include a storage space 150–156, respectively. In FIG. 1, storage spaces 150–156 are shown to reside in their corresponding computer system components. It should be appreciated that storage spaces 150–156 may reside external to the corresponding computer system components. The storage space in the computer system components operate to store a value indicating a power management state of the computer system components. The storage spaces 150–156 may be any size and may be used to store additional information such as power management capabilities and settings of the computer system component. It should be appreciated that the computer system 100 may include any number of I/O buses and that each of the I/O buses may include any number of known computer system components and that each of the computer system components may be configured to have their own storage space to store a value indicating a power management state of the computer system component. Each of the computer system components include at least one function that is defined as a specific job that the component performs. It should also be appreciated that a computer system component may host multiple functions. In a situation where a computer system component hosts more than one function, the computer system component may be configured such that each of the functions may have their own storage space.

Figure 2:
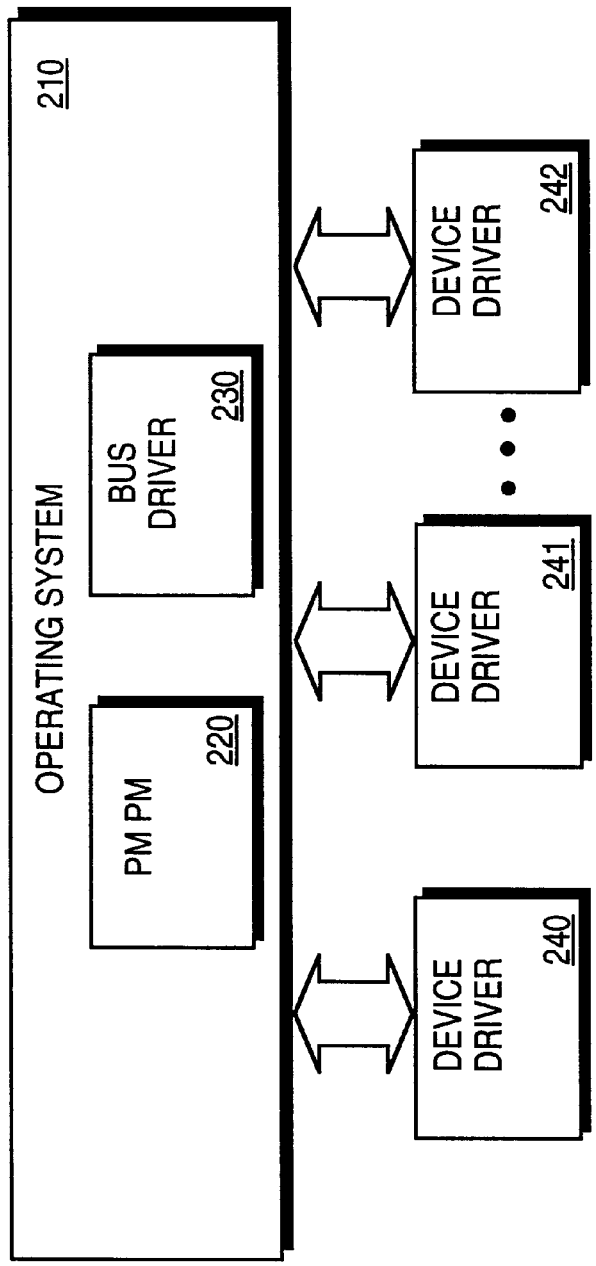
FIG. 2 is a block diagram of software modules implementing an embodiment of the present invention.

FIG. 2 is a block diagram illustrating software modules 210, 220, 230, 240–242 implementing an embodiment of the present invention. According to one embodiment, power management is performed by the computer system 100 (shown in FIG. 1) in response to the processor 101 (shown in FIG. 1) executing sequences of instructions contained in the memory 113 (shown in FIG. 1) represented by software modules 210, 220, 230, 240, 241, 242. Such instructions may be read into the memory 113 from other computer-readable mediums such as data storage device 131 (shown in FIG. 1) or from a computer connected to the network via the network controller 111. Execution of the sequences of instructions contained in the memory 113 causes the processor to support power management, as will be described hereafter. In alternative embodiments, hard-wire circuitry may be used in place of or in combination with software instructions to implement the present invention. Thus, the present invention is not limited to any specific combination of hardware circuitry and software.

Block 210 represents an operating system of the computer system 100. The operating system 210 manages the resources of the computer system 100 which include scheduling and allocation of hardware resources and software resources. The operating system 210 includes information regarding the functions in the computer system 100 and the activities and anticipated activities. An anticipated activity of a function is a future activity that the function may be required to participate in based upon present applications that are running in the computer system.

Block 220 represents a power management policy manager that resides in the operating system 210. The power management policy manager 220 uses information regarding the functions in the computer system 100 and the activities and anticipated activities of the functions to implement a strategy to conserve power in the computer system 100. The power management policy manager 220 defines a set of power management states that the computer system 100 supports. The power management policy manager 220 assigns a power management state to each of the functions in the computer system 100. The set of power management states supported by the power management policy manager 220 may include as few as two states such as an active state and an inactive state. The active state may be defined as a state where the function is fully operational and full power is supplied to support the function. The inactive state may be defined as a state where the function is partially operational. To conserve power in the inactive state, I/O bus traffic generated by the function or sent to the function may be halted, the clock to the function may be regulated down, or power supplied to the function may be reduced. It should be appreciated that the power management policy manager 220 of the present invention may support any number of power management states that define any known type of conditions for the functions in the computer system 100.

According to an embodiment of the present invention, the power management policy manager 220 assigns a power management state to a non-originating device function based on the activities and the anticipated activities of the function. For example, the power management policy manager 220 may monitor applications that are open and determine the functions that need to be active to support the applications. The power management policy manager 220 may also determine a period of time that a function must be able to wake up or transition to another state and assign a power management state based on the period of time.

According to an embodiment of the present invention, the power management policy manager 220 assigns a power management state to an originating device function based on the power management states of functions connected to its downstream bus. Since an originating device is programmable to regulate its corresponding I/O bus, the power management policy manager 220 may regulate an I/O bus by regulating its originating device. According to one embodiment, the power management state assigned to an originating device function is one that is as active as the most active power management state assigned to a function connected to the I/O bus downstream from it. This policy allows the I/O bus corresponding to the originating device to be placed in a power management state that supports the activities of the most active function connected to it. According to the present invention, the power management policy manager 220 explicitly sets and determines the power management state of an I/O bus by virtue of the originating device of the I/O bus. I/O buses are typically transparent to software as only the I/O devices and functions connected to the I/O bus are enumerated by software. The present invention enables the power management policy manager 220 to derive precise information as to the power management state of a given I/O bus as well as altering the power management state of the I/O bus.

Blocks 240–242 represent device drivers. Each I/O device in the computer system 100 has a corresponding device driver. A device driver operates to allow the operating system 210 to communicate with its corresponding I/O device. After the power management policy manager 220 has decided to change a function's power management state, it informs the corresponding device driver about the power management state that its function has been targeted for. The device driver responds by preparing the function for the targeted power management state. For example, when a function is targeted for a power management state where power to the function is to be reduced, the device driver may save relevant data in the function so that the data will not be lost. When a function is targeted for a power management state where it is to be awakened from an inactive state, the device driver may retrieve relevant data that was saved belonging to the function and restore the data in the function so that the function is fully operational upon wake up. It should be appreciated that the device driver may be configured to perform other tasks to the function to prepare it for transitioning into a next power management state. After the device driver has completed the tasks for preparing the function for the targeted power management state, the device driver regulates the function to the conditions required by the power management state. According to an embodiment of the present invention, this may require not accepting or generating any traffic on the I/O bus connected to the I/O device, regulating the clock to the function, or regulating power to the function. According to an embodiment of the present invention where the function is an originating device function that manages an I/O bus, this may additionally require instructing a bus regulator on the originating device to further regulate the I/O bus to a second power management state corresponding to the I/O bus.

According to an embodiment of the present invention, the power management policy manager 220 includes a class driver that corresponds to each of the device drivers 240–242. The class drivers operate to communicate with their corresponding device driver. It should be appreciated that the class driver could reside internal or external to the power management policy manager 220.

Block 230 represents a bus driver 230 of the computer system 100. The bus driver 230 manages interfaces that are native to the first I/O bus 120 and the second I/O bus 130. The bus driver 230 discovers the identity of the I/O functions connected on the first I/O bus 120 and the second I/O bus 130, and the requirements of the functions. After a device driver regulates a function to the condition required by a targeted power management state, the device driver informs the power management policy manager 220 that the function has been regulated to the targeted power management state. The power management policy manager 220 then instructs the bus driver 230 to write a value in a storage space corresponding to the function that indicates that the function is in the targeted power management state. The value indicating the power management state of a function may be read by the power management policy manager 220 to determine a power management state of an originating device function.

The present invention provides a method for managing power to functions in I/O devices and bus bridges, and buses in a computer system. The power management policy manager 220 may utilize information in the operating system 210 regarding the activities and anticipated activities of any function in the computer system. This allows the power management policy manager 220 to develop a strategy for power management that is inclusive of all functions in the computer system, not one that is just based on a select group of I/O devices or functions. Thus, add on I/O devices with new functions that are connected to a computer system will be recognized by the power management policy manager 220 as will their special power management requirements. Having access to the activities and anticipated activities of functions in a computer system allows the power management policy manager 220 to accurately determine when a specific function needs to be active and when the function may be inactive. This allows the power management policy manager 220 to develop an aggressive power management strategy that increases power savings without interfering with the performance of the computer system 100.

In a preferred embodiment of the present invention, the power management policy manager 220 supports five power management states for functions in the computer system 100. The five power management states are D0, D1, D2, $D3_{hot}$ and $D3_{cold}$, where the states are listed in the order where D0 is the most active state and $D3_{cold}$ is the least active state. In the D0 state, a function is fully operational. The function may accept or generate traffic on the I/O bus it is connected to. All functions must be put into D0 before being used. In the D1 state, a function is in light sleep. The function may not accept any traffic or generate any traffic on the I/O bus it is connected to, and power to the function is reduced. In the D2 state, a function is in deeper sleep. The function may not accept any traffic or generate any traffic on the I/O bus it is connected to, power to the function is reduced, and the clock to the function may be stopped. In the $D3_{hot}$ state, a function is in the lowest power consuming state with full power to the device. The function must have relevant data corresponding to the function saved before entering the $D3_{hot}$ state to prevent losing the data. In the $D^3$cold state power is removed from the device which hosts the function.

In the preferred embodiment of the present invention, the power management policy manager 220 also supports four power management states for the I/O buses in the computer system 100. The four states are B0, B1, B2, and B3, where the states are listed in the order where B0 is the most active state and B3 is the least active state. In the B0 state, the I/O bus is fully operational and the I/O bus supports data transactions. In the B1 state, the I/O bus is idle. Power is still applied to all functions connected to the I/O bus, however no bus transactions are allowed to take place on the I/O bus. In the B2 state, the clock to the I/O bus is stopped. In the B3 state, power has been removed from all devices connected to the I/O bus. According to an embodiment of the present invention, the power management state of an I/O bus corresponds directly with a power management state of the originating device of the I/O bus. Thus, when the power management state of the bridge memory controller 111 (shown in FIG. 1) is D0, D1, D2, or D3 ( D3$_{hot}$ or D3$_{cold}$), the power management state of I/O bus 120 (shown in FIG. 1) may be determined to be B0, B1, B2, and B3, respectively. FIG. 3 shows a table that illustrates the power management states supported by an embodiment of the present invention.

According to a preferred embodiment of the present invention where computer system components 111, 121–123, and 131–133 are PCI components, the functions in the computer system 100 communicate their power management capabilities via a standard PCI configuration space header located in the storage spaces 150–156 (shown in FIG. 1) corresponding to each function, respectively. FIG. 4 is a block diagram illustrating a standard PCI configuration space configured to support the power management according to an embodiment of the present invention. A bit in the PCI status register 410 indicates the presence or absence of a capabilities list. When a capabilities list is present, the capabilities pointer 420 includes an address that points to a linked list of registers in the storage space. The bus driver 230 (shown in FIG. 2) traverses this list to determine whether the function supports power management. According to one embodiment, a first register in the linked list includes a first field that stores a first value that defines a set of power management states that the function supports. A second register linked to the list includes a second field that stores a value that indicates whether power management in the function is enabled. A third register linked to the list includes a third field that stores a third value that indicates a power management state that the function is in. It should be appreciated that the computer system components 111, 121–123, and 131–133 may communicate their power management capabilities, settings, and states using any known technique.

Figure 5:
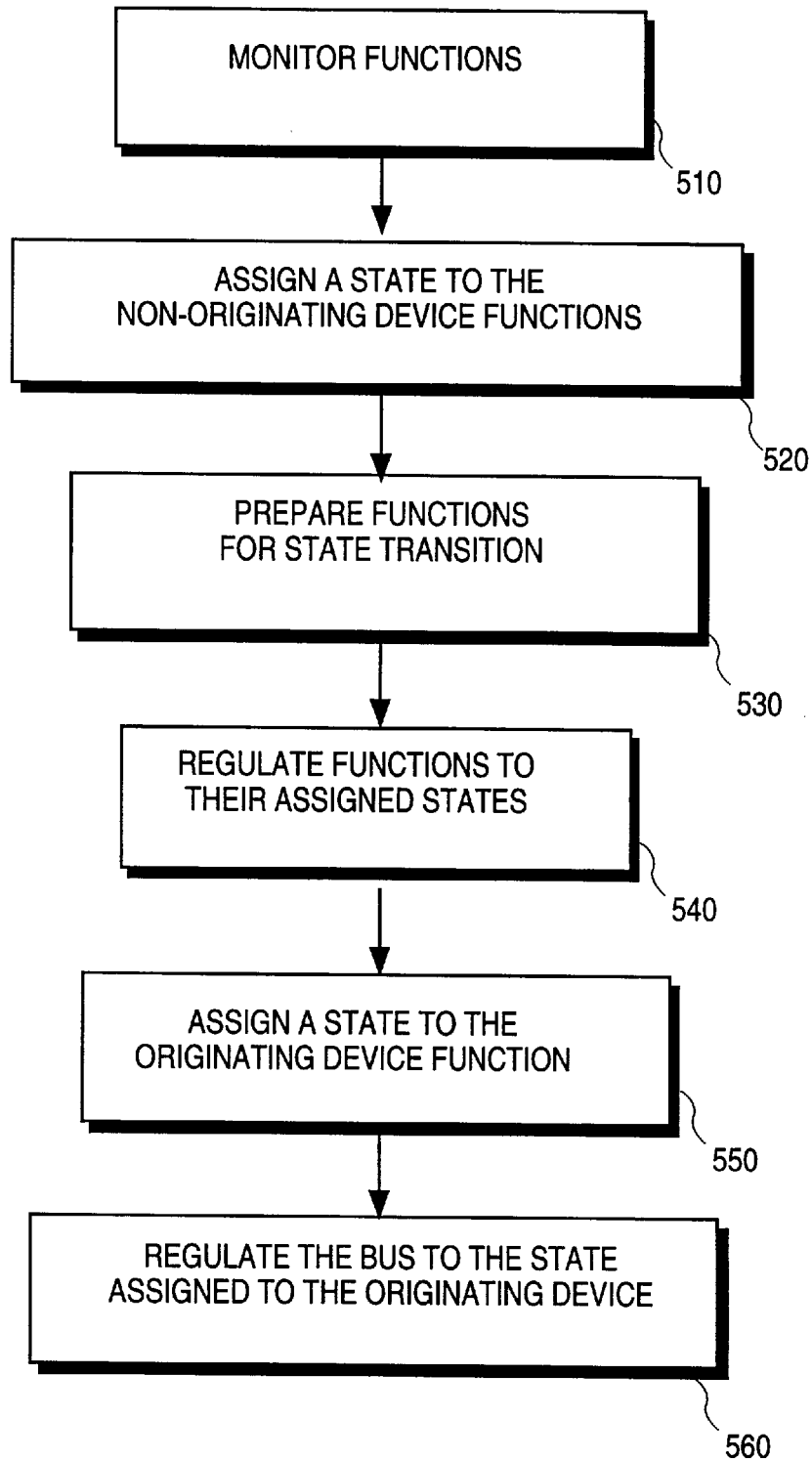
FIG. 5 is flow chart illustrating a method for power management according to an embodiment of the present invention.

FIG. 5 is a flow chart illustrating a method for power management according to an embodiment of the present invention. At step 510, functions corresponding to computer system components (I/O devices and bus bridges) are monitored. Specifically, activities and anticipated activities of the functions are monitored. According to an embodiment of the present invention, information about the identity of all the functions in the computer system are obtained from the operating system of the computer system. The operating system manages the resources of a computer system and includes information regarding the functions and the activities and anticipated activities of the functions in the computer system.

At step 520, power management states are assigned to the functions. According to an embodiment of the present invention, power management states are assigned to non-originating device functions connected to a bus based upon the activities and anticipated activities of the functions.

At step 530, the non-originating device functions are prepared for transitioning into their assigned power management states. According to an embodiment of the present invention, preparation for transitioning may include saving relevant data in the function or restoring saved data to the function. Preparation for transitioning may be performed by device drivers corresponding to the non-originating device functions or by other known circuitry or techniques.

At step 540, the non-originating device functions are regulated to the condition defined by their assigned power management states. According to an embodiment of the present invention, regulation may include halting data traffic generated by the function or sent to the function, adjusting clock speed to the function, or adjusting power to the function. The regulation may be performed by device drivers corresponding to the non-originating device function or by other known circuitry or techniques.

At step 550, a power management state is assigned to an originating device function that regulates the bus. According to an embodiment of the present invention, the originating device function is assigned a power management state that belongs to a most active function connected to the bus.

At step 560, the bus is regulated to the condition defined by the power management state assigned to the originating device. According to an embodiment of the present invention, regulation may include halting traffic on the bus, adjusting clock speed on the bus, or adjusting power to the bus. The regulation may be performed by a bus regulator on the originating device or external to the originating device or by other known circuitry.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. An apparatus, comprising:
    a first register having a first field that stores a first value that indicates a power management state of a bus that is based on a second value that indicates a power management state of a component coupled to the bus; and
    a bus regulator, coupled to the first register, that regulates the bus according to the power management state.

2. The apparatus of claim 1, wherein the bus regulator is a clock regulator that adjusts a speed of the bus according to the power management state.

3. The apparatus of claim 1, wherein the bus regulator is a power regulator that adjusts power to the bus according to the power management state.

4. The apparatus of claim 1, further comprising a second register having a second field that stores a third value that indicates power management states that the apparatus supports.

5. The apparatus of claim 4, further comprising a third register having a third field that stores a fourth value that indicates whether bus regulating functions to the bus are enabled/disabled.

6. A computer system, comprising:
    a first bus;
    a processor coupled to the first bus;
    a second bus;
    an apparatus, coupled to the first and second bus, including a first register having a first field that stores a first value that indicates a power management state of the second bus that is based on a second value that indicates a power management state of a component coupled to the second bus, and a bus regulator, coupled to the first register, that regulates the second bus according to the power management state.

7. The computer system of claim 6, wherein the bus regulator is a clock regulator that adjusts a speed of the second bus according to the power management state.

8. The computer system of claim 6, wherein the bus regulator is a power regulator that adjusts power to the second bus according to the power management state.

9. The computer system of claim 6, further comprising a second register having a second field that stores a third value that indicates power management states that the apparatus supports.

10. The computer system of claim 9, further comprising a third register having a third field that stores a fourth value that indicates whether bus regulating functions to the bus are enabled/disabled.

11. An apparatus, comprising:
   means for storing a first value that indicates a power management state of a bus that is based on a second value that indicates a power management state of a component coupled to the bus; and
   means for regulating the bus according to the power management state.

12. A method for managing a bus, comprising:
   assigning a first power management state to a first function of a component connected to the bus;
   assigning a second power management state to an originating device of the bus based on the first power management state; and
   regulating the bus to the second power management state assigned to the originating device.

13. The method of claim 12, wherein the step of assigning the power management state to the originating device comprises assigning to the originating device a power management state belonging to a most active function on the bus.

14. The method of claim 12, wherein the step of regulating the bus to the power management state assigned to the originating device comprises instructing a bus regulator on the originating device to regulate the bus.

15. The method of claim 12, further comprising the step of:
   preparing the first function for transitioning into the first power management state;
   regulating the first function to the first power management state; and
   writing a value in a register corresponding to the first function that indicates that the first function is in the first power management state.

16. The method of claim 12, further comprising the step of writing a value in a register corresponding to the originating device that indicates that the originating device is to be put in the second power management state.

17. A computer-readable medium having stored thereon sequences of instructions, the sequences of instructions including instructions which, when executed by a processor, causes the processor to perform the steps of:
   assigning a first power management state to a first function of a component connected to a bus;
   assigning a second power management state to an originating device of the bus based on the first power management state; and
   regulating the bus to the second power management state assigned to the originating device.

18. The computer-readable medium of claim 17, wherein the step of assigning the power management state to the originating device comprises assigning to the originating device a power management state belonging to a most active function on the bus.

* * * * *